United States Patent [19]

Kelly et al.

[11] E Patent Number: Re. 31,959

[45] Reissued Date of Patent: Jul. 30, 1985

[54] SEALING MEANS FOR A COKE OVEN CHUCK DOOR

[75] Inventors: Calvin E. Kelly, Murrysville; Richard W. Stanley, Monroeville, both of Pa.

[73] Assignee: United States Steel Corporation, Pittsburgh, Pa.

[21] Appl. No.: 254,250

[22] Filed: Apr. 15, 1981

Related U.S. Patent Documents

Reissue of:

[64] Patent No.: 4,216,062
Issued: Aug. 5, 1980
Appl. No.: 8,992
Filed: Feb. 5, 1979

[51] Int. Cl.[3] ..... C10B 25/06; C10B 25/16

[52] U.S. Cl. ..... 202/248; 110/173 R; 202/269

[58] Field of Search ..... 202/248, 269; 110/173 R

[56] References Cited

U.S. PATENT DOCUMENTS

| | | | |
|---|---|---|---|
| 2,338,675 | 1/1944 | Van Ackeren | 202/248 |
| 2,442,391 | 6/1948 | Wilputte | 202/248 |
| 3,567,590 | 3/1971 | Reinfeld et al. | 202/248 |
| 3,990,950 | 11/1976 | Carr | 202/248 |
| 4,086,231 | 4/1978 | Ikio | 202/248 |

*Primary Examiner*—Bradley Garris
*Attorney, Agent, or Firm*—William F. Riesmeyer

[57] ABSTRACT

A sealing means for a coke oven chuck door. The sealing means includes a metal sealing member which has springiness and flexibility and is supported cantilever fashion on the inside of the door frame. An insulation block is interposed between the sealing member and door frame. The sealing member has a knife edge flange which extends around its perimeter and is automatically aligned with a sealing surface on the main door on which the chuck door is mounted.

2 Claims, 3 Drawing Figures

SEALING MEANS FOR A COKE OVEN CHUCK DOOR

Matter enclosed in heavy brackets [ ] appears in the original patent but forms no part of this reissue specification; matter printed in italics indicates the additions made by reissue.

This invention relates to an improved sealing means for a coke oven chuck door.

In the coke oven art, a chuck door is a small door mounted on the main door near the top at the pusher side of the oven. After coal is charged to an oven, the chuck door is opened to admit a leveler bar mounted on the pusher machine. The leveler bar is used to level the top of the charge and then withdrawn, after which the chuck door is closed. Reference can be made to Reinfeld et al U.S. Pat. No. 3,567,590 or Carr U.S. Pat. No. 3,990,950 for exemplary showings of chuck doors.

There is a problem in providing an effective seal between a chuck door and the main door on which it is mounted. Conventionally, a chuck door carries a knife edge sealing strip which extends around its perimeter and abuts a flat metal surface on the main door. The doors tend to warp unevenly when the oven is heated, whereby the chuck door on closing may not remain in parallel alignment with the main door. It is important that the sealing edge of the chuck door is properly aligned with the main door to enable it to abut the sealing surface of the latter and provide a metal-to-metal seal at all points and thus prevent objectionable emissions from the oven.

An object of our invention is to provide an improved chuck door, the sealing member of which has springiness and flexibility to align the sealing edges automatically with the sealing surface of the main door and assure a metal-to-metal seal.

A further object is to provide a chuck door in which the sealing member has a cantilever support means and is insulated to minimize transfer of heat to the door frame.

A further object is to provide an improved chuck door wherein the knife edges are formed on a removable sealing member which can be replaced when damaged without otherwise dismantling the door or taking the oven out of service.

Figure 1:
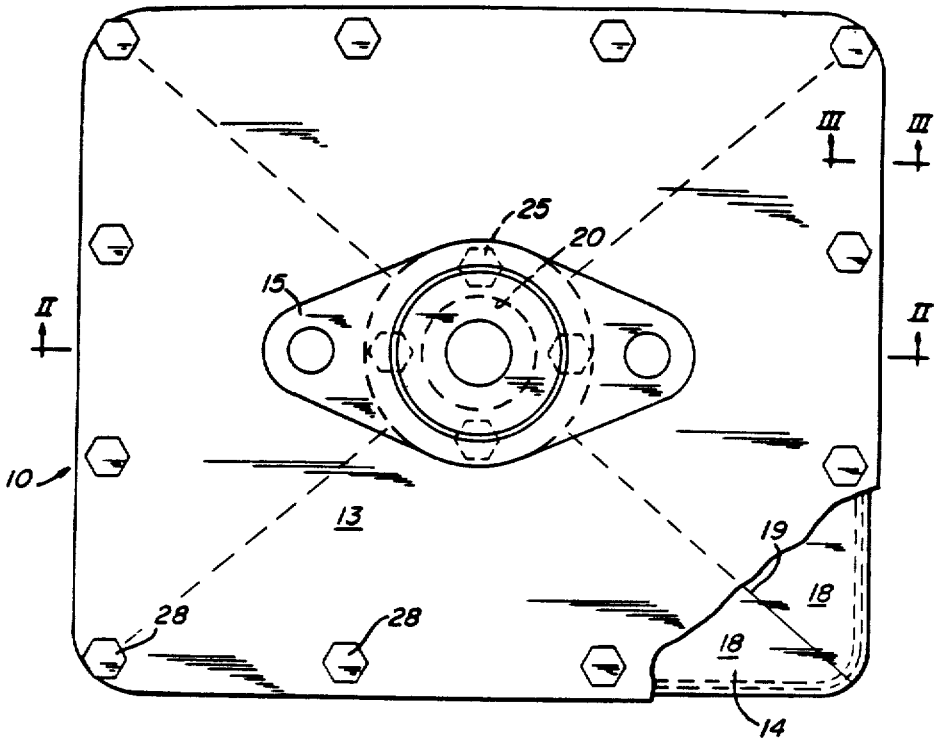
FIG. 1 is a front elevational view of a chuck door embodying our invention.

The drawing shows a chuck door 10 and a portion of a conventional main coke oven door 12 on which the chuck door is mounted. The chuck door includes a conventional metal frame 13 and a sealing member 14 constructed and supported in accordance with our invention. The frame 13 has the usual support flange 15 which projects from its outside face. A conventional latch mechanism (not shown) is attached to the support flange.

The sealing member 14 preferably is formed of four structural steel angles 18 welded together along joints 19 to form a rectangle with an opening 20 at the center. We illustrate the joints 19 as lying on diagonals of the rectangle, but this is optional. We prefer to form the sealing member of a plurality of welded structural pieces to provide optimum springiness and flexibility, but alternatively we can form the member of a single piece. The sealing member has a knife edge flange 21 which extends around its perimeter to abut a flat sealing surface 22 on the main door 12.

We affix the sealing member 44 to the door frame 13 at the inside face of the latter with a plurality of cap screws 25 spaced around the central opening 20 and a cap plate 26 which overlies the opening. We interpose an insulating block 27 between the frame 13 and sealing member 14. The block 27 may be of any suitable insulating material, for example, asbestos or various proprietary castable refractories, such as "Fiberfrax". The screws 25, *cap-plate 26* and insulating block 27 provide [a] *uniform* cantilever support *at the congruent peripheries thereof along a continuous line of arcuate-shape,* for the sealing member 14. *As shown in FIG. 1, it is preferable that such arcuate shape be circular.* The block minimizes transfer of heat from the sealing member to the frame 13 and thus forestalls warping of the latter.

Figure 2:
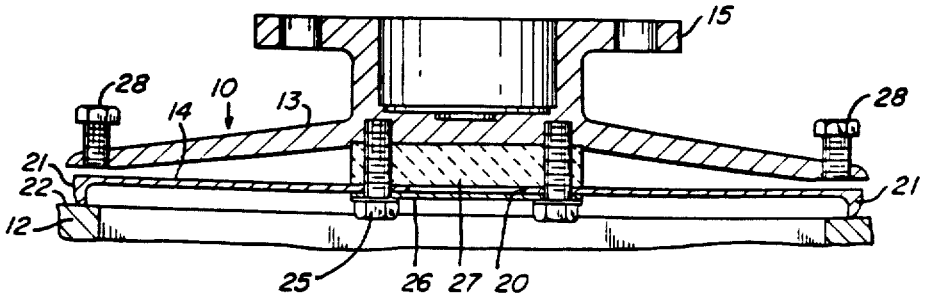
FIG. 2 is a horizontal section through the door taken on line II—II of FIG. 1.

Preferably the frame 13 carries a plurality of pressure screws 28 spaced around its perimeter. Normally, the pressure screws clear the sealing member 14 as shown in FIG. 2. *It will be apparent, that the springiness and flexibility of the sealing member, is desirably achieved by a cantilever arm, the length of which is significantly greater than the distance of such clearance said cantilever arm being defined as the distance from the outer periphery of plates providing cantilever support to the axis of the flange of said sealing member at any of the various locations around the periphery of the sealing member. Clearance is defined as the distance between the outer face of the sealing member and the frame 13 at any location along the length of the cantilever arm of said sealing member before said sealing member is pressed against the sealing surface of the main door.* When there is localized damage to the flange 21 or the flat surface 22, the screws 28 overlying the damaged region may be tightened to force the sealing member inwardly so that it still can provide a seal. This, of course, is a temporary expedient, and the sealing member is replaced at an early opportunity.

Figure 3:
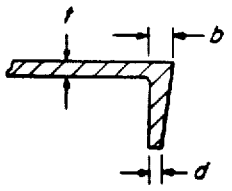
FIG. 3 is a horizontal sectional view on a larger scale taken on line III—III of FIG. 1 illustrating a detail, omitting the door frame.

Certain dimensions of the sealing member 14 are critical, as shown in FIG. 3. The thickness d of flange 21 at its knife edge should be about ⅛ inch, plus or minus about 1/32 inch. If the thickness is less than about 3/32 inch, the edge does not stand up in service and shows a poor life. If the thickness is greater than about 5/32 inch, the edge does not cut through carbon which is deposited on the surface 22 and there is no metal-to-metal seal established. The thickness b of flange 20 at its base should about 1.5 times thickness d of the flange at its knife edge. The thickness t of the rectangular body of the sealing member 14 should be about 0.10 to about 0.15 inch to provide springiness and flexibility along with ruggedness.

From the foregoing description, it is seen that out invention provides a chuck door, the sealing member of which has springiness and flexibility. The cantilever mounting of the flexible sealing member automatically assures that the knife edges are in proper alignment with the sealing surface of the main door. Whenever the sealing member is damaged, it is readily removed and replaced.

We claim:

[*1. In a chuck door which includes a frame and a sealing member supported on said frame at the inside surface thereof, the improvement comprising* means providing a cantilever support for said sealing member on said frame;

said sealing member being of metal which provides springiness and flexibility and having a knife edge extending around its perimeter and being removable from said frame for replacement.]

[2. The apparatus as defined in claim 1 including insulating means forming part of said cantilever support means and minimizing transfer of heat from said sealing member to said frame.]

[*3. The apparatus as defined in claim 1 in which said sealing member is formed of a plurality of structural metal peices welded together to form a rectangle.*]

[4. The apparatus as defined in claim 1 comprising in addition a plurality of pressure screws spaced around the perimeter of said frame and normally clearing said sealing member but being engageable therewith when localized damage occurs.]

[5. The apparatus as defined in claim 1 in which said sealing member is rectangular in outline and has a flange extending around its perimeter on which said knife edge is formed, said flange having a thickness at said knife edge of about ⅛ inch plus or minus about 1/32 inch and a thickness at its base about 1.5 times the thickness at said knife edge, the rectangular portion of said sealing member having a thickness of about 0.10 to about 0.15 inch.]

[6. In a chuck door which includes a frame and a sealing member supported on said frame at the inside surface thereof, the improvement comprising:

said sealing member being of rectangular outline having a flange extending around its perimeter and a knife edge on said flange;

said flange having a thickness at said knife edge of about ⅛ inch plus or minus about 1/32 inch and a thickness at its base about 1.5 times the thickness at its knife edges;

screw means at the central portion of said sealing member affixing said sealing member to said door frame, and an insulating block interposed between said sealing member and said door frame to minimize transfer of heat therebetween;

said screw means and said block providing a cantilever support for said sealing member;

said sealing member being of a metal which provides springiness and flexibility and being removable from said frame for replacement.]

*7. In a chuck door, said door including a frame and a substantially rectangular sealing member having a planar surface, said member also having a peripheral flange for mating with and extending inwardly toward a sealing surface for said door, the outward face of said member being mounted to said frame, the improvement in said chuck door which comprises:*

*said member being mounted to said frame to provide an intentional clearance for flexural movement of the sealing member flange both inwardly and outwardly,*

*said sealing member having a substantial opening in the center thereof,*

*first and second plates, centrally mounted on opposite sides of the planar surface of the sealing member,*

*said plates extending congruently around the opening in the sealing member and being joined thereto,*

*at least one of said plates closing said opening in the sealing member, the peripheral edges of said plates having an arcuate shape to provide uniform cantilever support along a continuous line for the arm formed by the planar surface of the sealing member, the length of said arm being significantly greater than said intentional clearance,*

*whereby, said sealing member has improved flexibility, providing automatic alignment of the flange thereof with the sealing surface for said chuck door.*

*8. The apparatus of claim 7 wherein said peripheral edges of the plates are of circular shape.*

* * * * *